UNITED STATES PATENT OFFICE.

EINAR LANGFELDT, OF BOSTON, MASSACHUSETTS.

PAINT.

1,397,103.    Specification of Letters Patent.    Patented Nov. 15, 1921.

No Drawing.    Application filed August 20, 1921.    Serial No. 493,880.

*To all whom it may concern:*

Be it known that I, EINAR LANGFELDT, a subject of the King of Norway, residing at Boston, county of Suffolk, State of Massachusetts, United States of America, have invented certain new and useful Improvements in Paint; and I do hereby declare the following to be a full, clear, and exact description of the invention, such as will enable others skilled in the art to which it appertains to make and use the same.

My invention relates to bituminous composition or paint for ship bottoms.

The practice heretofore of coating ship bottoms has been to coat the cleaned steel plates of the ships' hulls first with an anti-corrosive paint and when this paint has sufficiently dried a coat of anti-fouling paint is applied intended to prevent barnacles, sea weeds and the like from attaching themselves to the bottom.

The so-called anti-corrosive paints are required to have rust preventing qualities but it is obvious, that danger of corrosion is far greater by reason of the tendency of the sea water to pass through this paint and produce the electrolytic action that is the cause of the corrosion.

In the anti-fouling paint the object is in most cases to mix with the paint strong poisons such as mercuric oxid, copper and mercury cyanids and also to so make the paint that it will flake or gradually fall off as the barnacles and marine growths attach themselves to it.

The attaching member of barnacles is not like the roots of a plant, a means of nutrition but acts solely as a mooring and when they once become attached the poisonous nature of the paint has but little effect on them.

It is therefore evident that a ship's bottom should have as smooth a surface as possible thus making it difficult for marine life to secure a hold thereon.

Coal tar has long been recognized as a rust preventing means but as a paint for ships' bottoms it is not used much for the reason that it does not dry and therefore is very quickly washed off.

The object of the present invention is to utilize the excellent properties of tar while avoiding the disadvantageous properties thereof as heretofore mentioned and I have solved this problem by the discovery that when tar, pitch and like products are mixed with a small percentage of an ester, such as a cellulose ester and a suitable vehicle that is capable of substantially dissolving both, there results a tar paint, that rapidly hardens, sticks very tightly to wood or metal surfaces and will not wash off, properties that are not common to either the tar or the ester alone.

As in most paints, the cellulose ester content may vary and I have found by experience that when using cellulose-acetate, the content of this ester may vary from one to twenty per cent. without diminishing too much the adhering properties of the paint or decreasing the elasticity of the paint film to too great a degree. I may use either high temperature or low temperature tars, pitch, asphaltum and like tarry products.

As vehicle any substance that will dissolve or substantially dissolve the products may be used and I have found acetone, tetra-chlor-ethane and the like quite suitable for the purpose.

As an example of such a paint the following has been found very efficacious for preventing the rusting of ships' bottoms:

130 lbs. of coal-tar
15 lbs. of cellulose acetate
285 lbs. of solvent, as acetone, tetra-chlor-ethane and the like.

Such a paint dries very quickly with a hard elastic film even if the dried film contains 90% of bituminous matter as tar.

Now while this has proven a most excellent rust preventing paint the problem has presented itself of how to prevent marine growths from adhering thereto.

Melted tallow was heretofore applied to the hulls of wooden ships for this purpose but it is not well suited for mixture with any rust proof paint and I have discovered a substance that does mix well with the paint and has the unctuous properties required, namely, naphthalene, $C_{10}H_8$ and by adding 40 pounds thereof to the above paint composition I obtain an ideal paint, both anti-corrosive and anti-fouling. The properties of naphthalene may be varied within wider limits than the ester content, the variation being from two to fifty per cent. of the mixture.

The naphthalene seems to crystallize after the solvent has evaporated leaving the surface smooth and greasy to the feel.

The bituminous tarry substance may or may not entirely dissolve in the vehicle solvent, and with coal tar the greater part remains in suspension in a solution of acetone and cellulose ester, but this fact in no way detracts from the efficacy of my paint.

I claim:

1. A bituminous paint comprising a bituminous tarry substance, a cellulose ester and a vehicle for both.

2. A bituminous paint comprising a bituminous tarry substance, cellulose acetate and a vehicle for both.

3. A bituminous paint comprising tar, a cellulose ester and a vehicle for both.

4. A bituminous paint comprising tar, a cellulose acetate and acetone.

5. A bituminous paint comprising tar, a vehicle and a cellulose ester from one to twenty per cent.

6. A bituminous paint composed of tar, one to twenty per cent. cellulose acetate and acetone.

7. A bituminous paint comprising a bituminous tarry substance, a cellulose ester, a substance giving an unctious surface to the paint film and a vehicle.

8. A bituminous paint comprising a bituminous tarry substance, a cellulose ester, naphthalene and a vehicle.

9. A bituminous paint comprising tar, a cellulose ester, naphthalene and a vehicle.

10. A bituminous paint containing a tarry substance, cellulose acetate, naphthalene and acetone.

11. A bituminous paint containing tar, cellulose acetate, naphthalene and acetone.

12. A bituminous paint comprising tar, a cellulose ester, two to fifty per cent. naphthalene and a vehicle.

13. A bituminous paint comprising coal tar, one to twenty per cent. cellulose acetate, two to fifty per cent. naphthalene and a vehicle.

14. An anti-rusting, anti-fouling bituminous paint containing naphthalene.

15. An anti-rusting, anti-fouling bituminous paint containing from two to fifty per per cent. naphthalene.

In testimony that I claim the foregoing as my invention, I have signed my name.

EINAR LANGFELDT.